Feb. 13, 1951   H. L. SMITH, JR., ET AL   2,541,113
PROCESS FOR CANNING AND STERILIZING FOOD PRODUCTS
Filed March 24, 1949   3 Sheets-Sheet 1
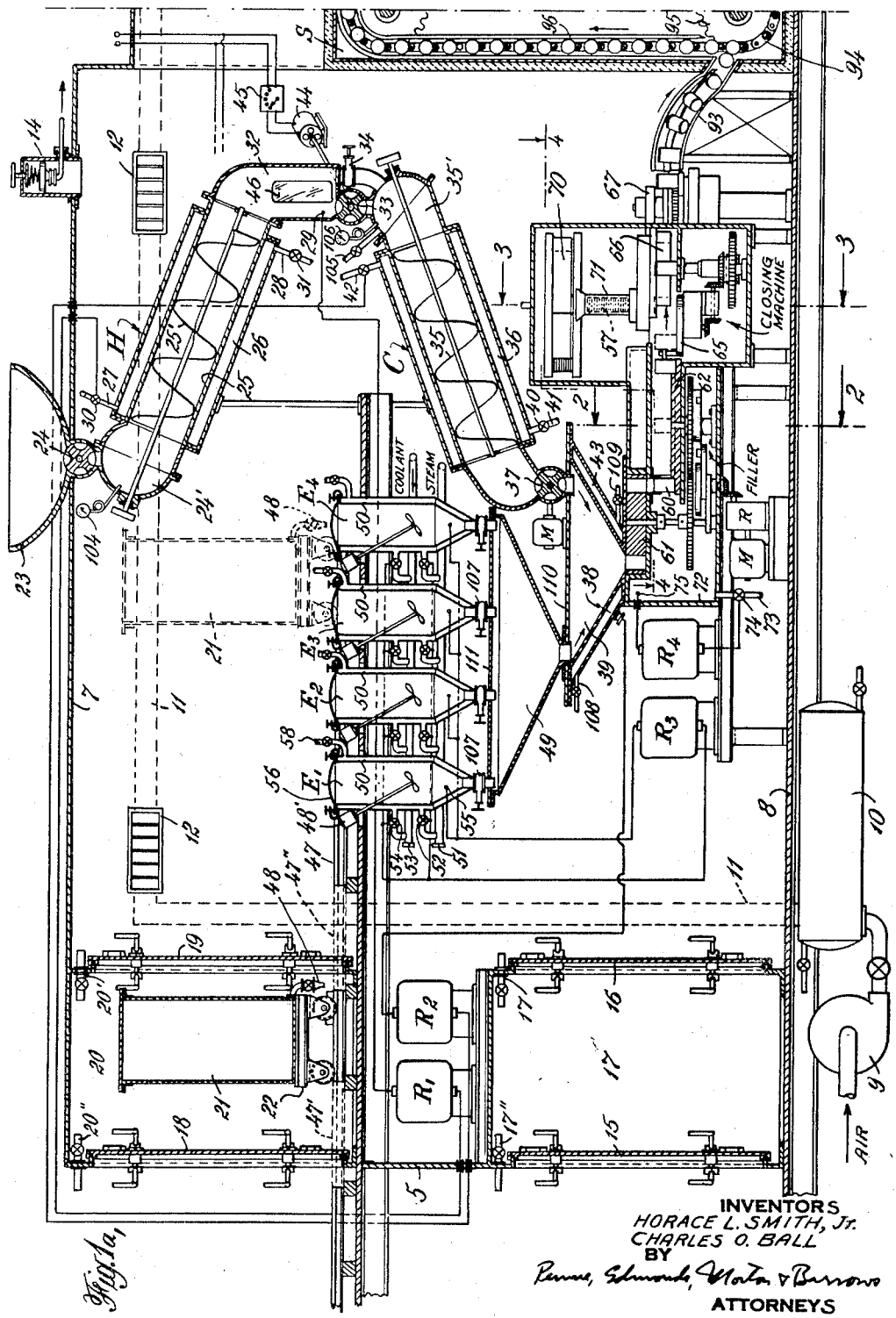
INVENTORS
HORACE L. SMITH, Jr.
CHARLES O. BALL
BY
ATTORNEYS

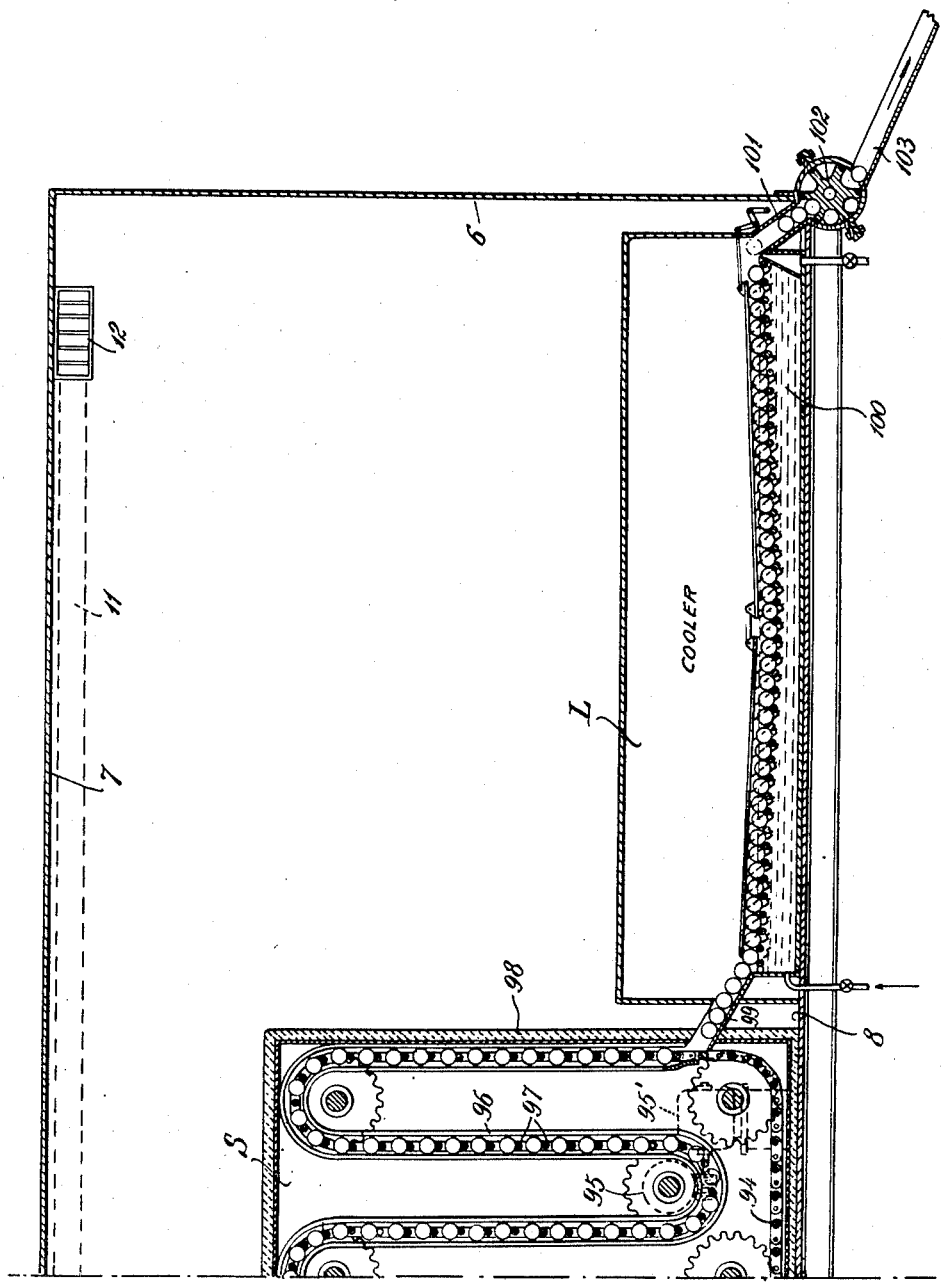

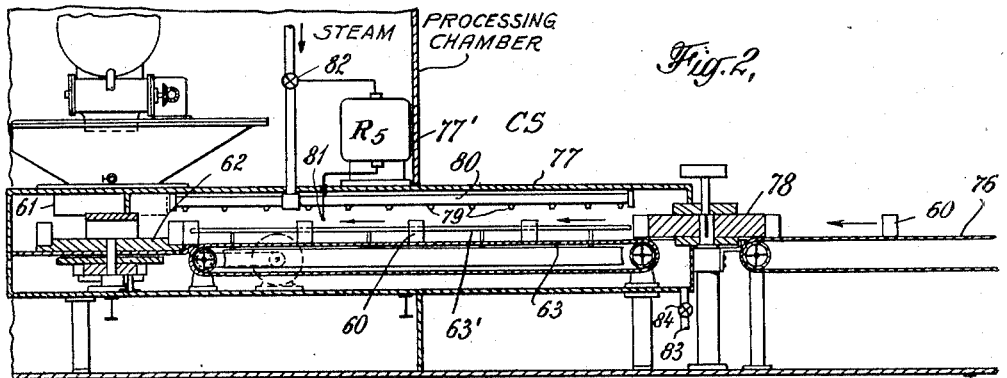
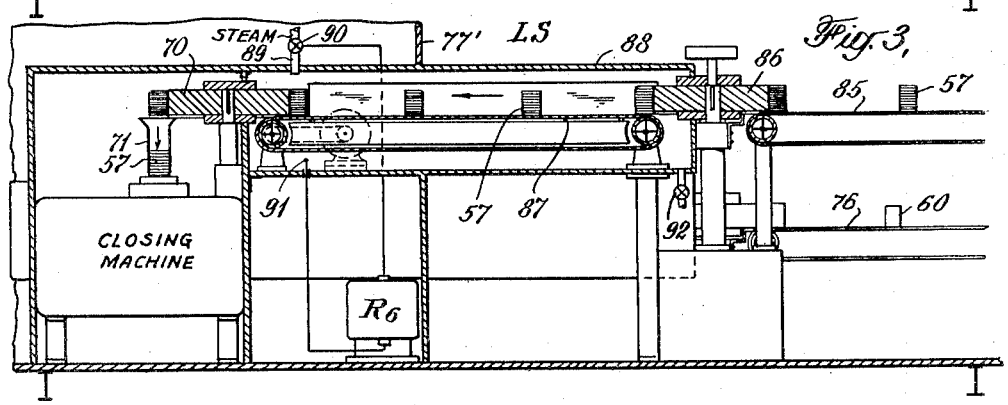
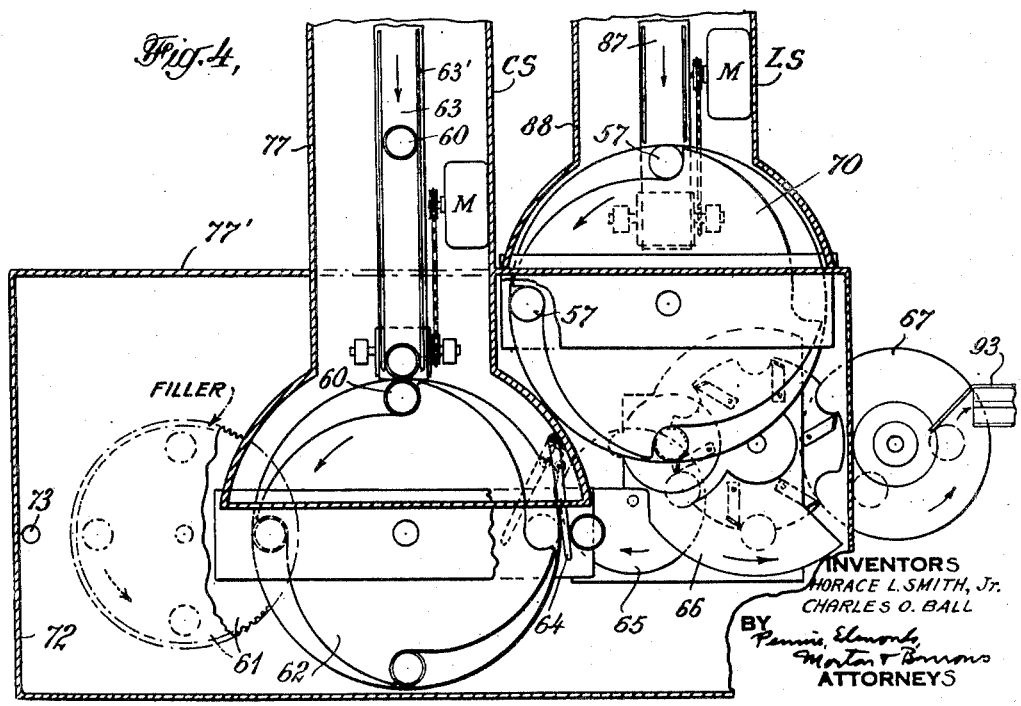

Patented Feb. 13, 1951

2,541,113

UNITED STATES PATENT OFFICE 2,541,113

PROCESS FOR CANNING AND STERILIZING FOOD PRODUCTS

Horace L. Smith, Jr., Richmond Va., and Charles O. Ball, Maumee, Ohio, assignors, by direct and mesne assignments, to Food Processes, Incorporated, Richmond, Va., a corporation of Virginia Application March 24, 1949, Serial No. 83,192

19 Claims. (Cl. 99—182)

1

This invention relates to the canning and sterilization of foods and more particularly concerns an improved process by which food products, and particularly liquid carried food products, may be preserved against spoilage in cans or other containers without undesirable alteration of the natural flavor or other properties thereof. The term "liquid carried food products" as used herein includes both liquid foods such as milk, soups, syrups and juices, and solid or semi-solid foods such as meat, hash, chop suey, stew, corn, peas, carrots, beets, spaghetti, and other vegetables that are carried in or canned with a sauce or other liquid. Although particularly applicable to such liquid carried products, the improved process is also applicable to substantially dry products, such as diced carrots and other vegetables.

The preservation of food in cans or like closed containers involves as an essential operation subjecting the food material to elevated temperatures for the purpose of destroying both pathogenic and spoilage organisms present therein. The spoilage organisms or bacteria encountered include not only such soil-borne and air-borne bacteria, molds and yeasts as may be present in or on the food, but also the organisms that are inevitably present in the air and on or in the can or other container in which the food is enclosed.

The preservation of so-called "low acid" foods, that is, foods whose pH values are from about 4.5 and upwards, requires temperatures substantially above 212° F. for sterilization within reasonable time intervals. Such foods, which include milk, meats, most common vegetables and soaps, are now preserved principally by a procedure that includes filling the food into cans or like containers and sealing same, then enclosing the containers in retorts or pressure vessels, introducing steam into the retorts under superatmospheric pressure sufficient to produce the necessary high retort temperature and continuing the pressure treatment for a time sufficient at such retort temperature to raise the can and its entire contents to the high temperature required and maintain it there for an interval sufficient to destroy the spoilage organisms in the food and the containers, then cooling the containers while reducing the pressure thereon to substantially atmospheric pressure, removing the containers from the retorts and finally further cooling the containers to a temperature near atmospheric temperature at which no further heat deterioration of the product takes place.

The described procedure essentially involves filling and closing the cans before heating them to the temperatures and for the time intervals required for sterilization. This procedure has been considered necessary for several reasons. The thermal destruction of spoilage organisms is a function of both temperature and time, destruction at relatively high temperatures being effected within much shorter time intervals than are required at lower temperatures. Thus, for example, spoilage organisms usually present in low acid foods are quite resistant to moderate temperatures and may survive the temperature of boiling water (212° F.) for a matter of many hours, whereas they are destroyed in a matter of minutes at temperatures of the order of 250–265° F. Prolonged heat treatment at temperatures above about 200° F. adversely affects the quality of the food with respect to flavor, consistency and color, and here the time factor is dominant—prolonged heating at moderate temperatures producing more marked deterioration than heating for short intervals at much higher temperatures. It is accordingly necessary to the attainment of the desired product quality that sterilization be effected rapidly and at a temperature well above 212° F. At such temperatures, the liquid content of the liquid carried food product is above its boiling point at atmospheric pressure. If the food were sterilized at high superatmospheric pressure and not cooled before filling into containers, it would flash or boil when entering the filling apparatus, and in so doing, would absorb heat to supply the latent heat of vaporization from non-evaporating portions of the food itself, from the filling apparatus and from the containers, and a consequent cooling of the food, the filling apparatus and the containers would result. This cooling of the product would permit survival of spoilage organisms so that complete sterilization would not be obtained. These undesirable results with respect to contamination or incomplete sterilization have been avoided by sealing the food within the containers before heating to the high sterilization temperatures required.

Sterilization in sealed containers has certain drawbacks that have hitherto been considered unavoidable. Because of the bulk of the food product enclosed in each container, the rate of heat transfer thereto is retarded and at least some parts of the container contents must be heated substantially above the desired temperature and for a time interval longer than is necessary for sterilization purposes in order to insure that all parts of the container contents are heated to the necessary temperature for the desired time. The result is that the quality of the product is impaired by overtreatment. The heat treatment under pressure of the food in closed cans is usually a batch operation involving considerable manual labor for placing the cans in the pressure retorts and removing them therefrom. The containers used are subject to deformation and rupture by excess internal pressure and so must frequently be cooled as the retort pressure is reduced and before the retort can be opened to the atmosphere to permit removal of the containers.

With the foregoing considerations in mind, we have devised an improved process for canning and sterilizing foods, and particularly liquid carried foods of the low acid type referred to, in which the above-mentioned drawbacks of sterilization in closed containers are avoided and canned food products of enhanced quality are produced. In accordance with our process, the food product in bulk is rapidly heated uniformly throughout to a high maximum temperature, substantially above the atmospheric boiling point of the product liquid and within a time interval less than that required for sterilization. This initial heating is preferably carried out with agitation which may comprise circulation, and may be carried out either in a closed container through which the product is continuously fed under a pressure sufficient to prevent boiling of the product liquid during the heating operation, or in a closed pressure vessel in which successive batches of the food product are treated in bulk. The adaptability of the process to batch treatment permits the handling of foods such as stews, hashes, etc., which may be adversely affected physically by continuous treatment. After the food product is raised to this maximum temperature, it is either held for a very short time interval at such temperature or immediately cooled rapidly to a lower temperature that will be termed the filling temperature, this being still above the atmospheric boiling point of the product liquid. The high maximum temperature is so chosen that during the period of heating to this temperature, the holding interval, if any, and the ensuing cooling to the filling temperature, the food is subjected to a heat treatment which has a lethal effect upon the spoilage bacteria which is from about 50% to 97% and preferably from about 70% to 95% of that required for complete sterilization. Immediately after cooling to the filling temperature, the produce is filled into containers such as cans and the cans are closed. According to our process, we prefer to partially sterilize the cans before they are filled with the product, as will be explained.

The filling of the product into the cans and the closing of the cans may be effected before the sterilization of the product has been completed, and these filling and closing operations are carried out under a superatmospheric pressure sufficiently high to prevent boiling of the product liquid at the high filling temperature of the product. During the time necessarily required to fill and close the cans and during an additional time interval when the closed cans are held substantially at the filling temperature, the sterilization of the food product as well as the containers is completed. In order to insure completion of the sterilization of the entire interior walls of the containers, the containers are preferably turned on their sides or inverted immediately after closing so as to bring the hot food product into contact with the covers as well as the side walls of the containers. Complete contact of the food product with the entire interior surfaces of the containers may be readily obtained by imparting a rolling motion thereto after the containers are turned on their sides.

The filled and closed containers are maintained at or substantially at the filling temperature for a time interval sufficient to complete the sterilization of the product and containers and then the canned product may be immediately cooled, still under superatmospheric pressure and preferably with agitation of the cans, to a temperature close to but somewhat above the atmospheric boiling point of the product liquid. This final cooling step may be omitted where small cans and low filling temperatures are used. When this cooling step has been completed, the canned product may be removed from the region of superatmospheric pressure and further cooled under ordinary atmospheric pressure conditions to a temperature at which no heat deterioration of the product takes place. The steps of the process beginning with the initial heating to the maximum temperature and continuing to the end of the initial cooling of the canned product are carried out in a room or enclosure maintained at a superatmospheric pressure high enough to prevent boiling of the product liquid at the filling temperature, and the enclosure is equipped with air locks and ventilating mechanism so that conventional apparatus may be employed in these operations and may be attended and adjusted by operating personnel. This arrangement also permits handling of food products in batches that may be brought into the enclosure in suitable kettles or like containers through air lock entrances.

The cans or like containers and their covers are partially sterilized prior to filling of the food product therein by heating them, preferably with steam, at the pressure prevailing in the room or enclosure or at a higher pressure. This may be conveniently accomplished by introducing the containers and their covers into the enclosure through suitable valves or air locks and conveying them in tunnels or passages into which steam at high temperature is introduced. These container conducting passages are of such length that the time interval required for each container to traverse them is sufficient at the temperature maintained therein to complete approximately 50% to 97% and preferably 70% to 95% of the sterilization of the containers by the time they reach the point where they are filled. The containers are preferably sterilized to substantially the same degree as the food product at the point of filling.

In the process of our invention, heat deterioration of the food product is minimized or avoided by using very high temperatures and short time intervals to accomplish sterilization. This is accomplished first by heating the food product in bulk, either in batches or continuously, within a pressure vessel which prevents boiling of the product liquid, the temperature attained being so high that the pressure required to prevent boiling is considerably above that maintained in the room where operating personnel is present. The ensuing partial cooling brings the food product down to a temperature just below the boiling point at the pressure of the filling room, so that the product can be filled without boiling and preferably with operators in attendance to maintain and service the filling and closing apparatus. The time interval during which the product is held at high temperatures is minimized both by using the extremely high maximum temperature step, which destroys spoilage organisms at an accelerated rate, and by utilizing the time necessarily consumed in filling and closing the cans to continue sterilization at a relatively high temperature, which, although lower than the maximum temperature, is still above the boiling point of the product liquid at atmospheric pressure. By partially pre-sterilizing the cans and their covers prior to filling, the containers are filled at a point when both product and containers are partially sterilized to approximately the same degree, whereby completion of the sterilization operations takes place simultaneously with respect to both the food product and the containers, and the food product is not maintained at an elevated temperature for any longer than is necessary to complete the sterilization.

Another advantage of our process is that by completing the sterilization of the can and product after closing, spoilage bacteria that may be accidentally introduced during the filling operation are destroyed. Such accidental contamination would constitute the introduction of a relatively small concentration of spores into the food, and it has been observed that the heat resistance of these spoilage organisms is considerably lower when they are in low concentration in the food product. Thus, the heat treatment which takes place after filling and closing and which completes the simultaneous sterilization of product and container is at the same time capable of destroying spoilage organisms in any low concentration that might be accidentally introduced during the filling of the containers.

In describing the invention in detail, reference will be made to the accompanying drawings in which one form of apparatus suitable for carrying out our improved process has been illustrated.

In the drawings—

Fig. 1a is a diagrammatic and simplified sectional elevation of a part of a processing room or enclosure equipped and containing apparatus for carrying out our improved process;

Fig. 1b is a view similar to Fig. 1a showing the remainder of the processing room or enclosure and its contents;

Fig. 2 is a sectional view taken along line 2—2 of Fig. 1a and illustrating the can sterilizing apparatus;

Fig. 3 is a sectional view taken along the line 3—3 of Fig. 1a and illustrating the can lid sterilizing apparatus; and Fig. 4 is a plan view showing the can propelling elements of the filling and closing apparatus.

In order that certain steps of our process may be carried out under superatmospheric pressure and that operating personnel may be present to control, adjust and operate conventional can filling and closing apparatus, we provide a processing room or enclosure illustrated by the side walls 5 and 6 and floor and ceiling 7 and 8. The room is substantially air tight, and air for ventilation purposes is supplied to the room by a pump or blower 9 through an air cooling, conditioning and sterilizing apparatus diagrammatically illustrated at 10 and suitable ducts 11 and outlets 12. An adjustable loaded air vent valve 14 permits the escape of air from the room when the desired superatmospheric pressure has been attained.

Air locks are provided for the admission of operating personnel and for the admission of batches of product when the process is operating on a batch basis. The air lock for personnel has been illustrated by two doors 15 and 16 which may be operated from either side and which respectively separate the air lock chamber 17 from the outer atmosphere and from the processing room. The doors 15 and 16 are provided with air tight seals of conventional construction. A like air lock having air tight doors 18 and 19 and a chamber 20 is provided for admitting batches of product which may be carried in a kettle 21 on a truck or dolly 22. The rails 47 for the truck 22 may have removable sections 47', 47" to permit operation of the doors 18 and 19. Valved pipes 17' and 20' are provided to controllably connect the respective chambers 17 and 20 with the interior of the processing room, whereby the pressure in these chambers may be brought up to the processing room pressure when personnel or equipment are being brought into the room. Similar valved pipes 17" and 20" permit equalization of the pressure in the chambers 17 and 20 respectively with the outside atmospheric pressure.

When the product is treated continuously, it is introduced to the processing room through a suitable inlet such as a hopper 23 having a rotary feed valve 24 that opens into the inlet chamber 24' of a continuous product heater H. This heater may take various forms, but preferably includes means for continuously agitating and advancing the product. Where the product is a liquid, a simple heat exchanger may be used. In the illustrated embodiment, the heater H includes a cylindrical chamber 25 having a screw conveyor 25' suitably supported therein to convey the product therethrough and agitate the product, and a heating jacket 26 through which steam or other heating fluid may be circulated from an inlet pipe 27 to a condensate outlet pipe 28. The screw conveyor 25' may be rotated by any suitable means. The temperature to which food is heated in the heater H is preferably controlled by thermostatic control mechanism illustrated at $R_1$ having a temperature responsive element 29 adjacent the outlet of the heater and acting to govern the opening of the valve 30 in the steam inlet pipe 27 of the jacket 26. The condensate outlet pipe 28 is provided with a valve 31.

The product heater H is preferably inclined as shown and is provided with a substantially vertical outlet chamber 32 which communicates through either a rotary pressure retaining valve 33 or a gate valve 34 with the inlet chamber 35' of a continuous product cooler C. The cooler C as shown is of the same general construction as the heater H, having a screw conveyor 35, a jacket 36 for cooling fluid, and a rotary outlet valve 37. The cooling of the product in the cooler C is preferably automatically controlled by known thermostatic responsive means here illustrated by the temperature responsive element 38 in the hopper 39 that receives the product, a control mechanism $R_2$ and a controlled cooling fluid valve 40 in the cooling fluid inlet pipe 41 to the jacket 36. A valved cooling fluid outlet pipe for the jacket 36 is illustrated at 42. The product in the hopper 39 may be maintained at the filling temperature by heat supplied from a jacket 42 on the hopper.

The rotary valves 24, 33 and 37 operate in a known manner to pass the product while maintaining a pressure difference between the chambers that they connect. These valves are driven by suitable means such as motors, one of which is illustrated at M in connection with the cooler outlet valve 37. The rotary valve 33 is driven by a variable speed drive here illustrated as a motor 44 governed by a speed controller 45 so that the rate of flow of product out of the vertical outlet chamber 32 can be variably adjusted by varying the speed of rotation of the valve 33. This arrangement permits holding of the product in the outlet chamber 32 for a brief interval where this procedure is desired. A window or sight glass 46 is provided in the wall of the chamber 32, and when it is desired to hold the product at the maximum temperature imparted thereto by the heater H, the rate of operation of the valve 33 is retarded until the requisite quantity of product has accumulated in the chamber 32, whereupon the rate of operation of the valve 33 is increased to the point where the desired quantity of product is maintained in the chamber 32.

In certain applications of our process, the product is maintained at the same pressure in the cooler C as that prevailing in the heater H. Under such conditions, the rotary valve 33 is held stationary and the gate valve 34 is opened so that the product flows directly from the heater to the cooler.

When the food product is treated in batches, it is brought into the processing room in a kettle 21 having a valved outlet spout 48. The kettle 21 may be moved on the truck 22 riding along the rails 47 to a position over any one of a number of agitating type heat exchangers illustrated at $E_1$, $E_2$, $E_3$ and $E_4$. These heat exchangers comprise jacketed cylindrical containers provided with propeller type agitators 48' and valve controlled outlets 107 opening into a hopper 49, which empties into the filling hopper 39. The jackets 50 of the heat exchangers may be supplied with a heating fluid such as steam from a pipe 51 under control of the valves 52 or with a cooling fluid from a pipe 53 under control of the valves 54. The temperatures to which the product is heated and cooled in the batch heat exchangers $E_1$, $E_2$, etc. may be controlled by thermostatic control mechanism illustrated at $R_3$ governed by temperature responsive elements 55 adjacent the outlets of the heat exchangers, and governing the heating fluid inlet valves 52 and the cooling fluid inlet valves 53. Condensate from heating fluid or spent cooling fluid is released from the jackets 50 through valved outlet pipes 53. Each of the batch heat exchangers $E_1$, $E_2$, etc. is provided with a removable pressure tight lid 56. The number of heat exchangers $E_1$, $E_2$, etc. may be varied to suit the operation and to provide a continuous flow of product to the filling mechanism from the hopper 39.

From the filling hopper 39 the product is filled into cans 60 by a can filling mechanism of conventional known construction here illustrated by the rotary filler 61 and rotary can feeder 62 (Figs. 1a and 4). The cans 60 are delivered to the rotary feeder 62 by the belt conveyor 63 of a can sterilizer CS, are filled as they pass under the filler 61 and are delivered by the arm 64 to the transfer table 65 of the can closing machine. The closing machine is also of known construction and is here illustrated by the rotary element 66. Can lids 57 are delivered to the closing machine from the belt conveyor 87 of a can lid sterilizer LS by a rotary feeder 70 which drops successive stacks of lids into the feed tube 71 of the closing machine.

The filling and closing mechanism is preferably enclosed in a housing 72, and the temperature within this housing is maintained at substantially the filling temperature of the process by introducing steam to the housing. Some of this steam enters the housing 72 through the rotary can and lid feeders 62 and 70, which act as rotary valves. Auxiliary steam for maintaining the desired temperature and causing an outward flow of air and steam from the housing 72 is supplied through a pipe 73 under control of a valve 74 governed by a control mechanism $R_4$, which in turn is generated by a temperature responsive element 75 located within the housing. The housing 72 is not fluid tight, and excess steam escapes therefrom at the point where the closed cans are carried out of the housing by the rotary table 67.

In accordance with our process, the cans and their lids are partially sterilized before filling and closing of the cans. The can sterilizer CS may extend transversely of the processing room as best shown in Fig. 2. Cans 60 carried by suitable means such as a belt conveyor 76 are valved into a fluid tight tunnel 77 which extends into the processing chamber through its rear wall 77'. A rotary pressure sealed valve 78 of known construction is shown for the purpose of so introducing the cans. A belt conveyor 63 having can guides 63' along its upper span carries the cans 60 through the tunnel 77 and delivers them to the rotary can feeder 62 which acts as a pressure tight valve at the delivery end of the tunnel. With this arrangement, the tunnel 77 can be isolated from the processing chamber by stopping rotation of the feeder 62, thereby permitting opening and adjustment or repair of the conveyor mechanism from outside the processing room. The cans are sterilized during their passage through the tunnel 77 by steam from outlets 79 in the pipe 80, the requisite can sterilizing temperature being maintained by thermostatic control mechanism $R_5$ governed by the temperature responsive element 81 in the tunnel 77 and governing the steam inlet valve 82. A condensate outlet pipe 83 controlled by a valve 84 releases steam from the tunnel 77. With the arrangement described, the cans 60 can be subjected to any desired temperature in the tunnel 77 by raising the steam pressure therein to a value appreciably above that prevailing in the processing chamber.

The can lid sterilizer LS may be of substantially the same construction as the can sterilizer CS. As shown in Fig. 3, the can lids 57 are delivered by a belt conveyor 85 to a rotary pressure tight inlet valve 86 which deposits the lids on a belt conveyor 87 in the tunnel 88. Steam is introduced to the tunnel 88 through a pipe 89 under control of a valve 90 which is thermostatically governed by the mechanism $R_6$ responsive to the temperature element 91 in the tunnel 88. A valved pipe 92 releases condensate from the tunnel 88. The can lids 57 are removed from the conveyor 87 by the rotary feeder 70 which serves as a pressure tight lid feeding valve at the delivery end of the tunnel 87, whereby this tunnel may be isolated from the processing room and maintained at a pressure above that prevailing in the processing room.

The filled and closed cans are turned on their sides by a can turning chute 93 of known construction as they leave the closing machine. According to our process, the filled and closed cans are then held for an interval at or substantially at the filling temperature. Apparatus for accomplishing this holding step is here illustrated as a serpentine can conveyor system S including a chain conveyor 94 carried by a series of sprockets 95, one of which is driven by the motor 95', as illustrated in Fig. 1b. Can guides 96 hold the successive cans between adjacent cross bars 97 of the chain conveyor 94. The conveyor 94 is preferably enclosed within an insulating chamber wall 98 so that the cans are maintained substantially at the filling temperature during the holding period.

From the outlet chute 99 of the holding conveyor system, the cans are delivered to a cooler L in which they are advanced through a body of water, brine or other liquid coolant 100, while being rotated to increase the rate of heat exchange between the can contents and the coolant. Suitable apparatus for accomplishing the rotating and advancing of the cans in the coolant is known and is disclosed, for example, in Patent No. 2,348,440. The cooler L, like the holding conveyor system, is at the same pressure as the processing chamber. The cans leave the cooler L through a chute 101, and a rotary pressure tight outlet valve 102 delivers the cans to a chute 103 outside the processing chamber. If no cooling step is employed, the cooler L can be used as a conveyor or the cans can be removed from the processing chamber as they come from the chute 99.

In carrying out our improved process, the food is first partially sterilized in bulk, that is, before filling into containers, and this may be accomplished either in a continuous or a batch operation. The continuous operation is preferred, but batch operation is advisable in cases where the physical character of the product may be undesirably altered in a continuous operation. Thus some products contain solid pieces that might jam or be subdivided in the rotary feed valves of the continuous treatment apparatus, or that might be disintegrated upon being abruptly subjected to a reduction in pressure on passing from the heater H to the cooler C. Pressure drops at this point can be avoided by supplying a partial pressure of sterilized non-condensable gas or in some cases steam to the cooler C as will be explained, but batch procedure may be preferable to such expedients with certain products.

Considering first our process as applied to a continuous operation, the pressure within the processing room or enclosure is maintained within the range of from 12 to 30 lbs. per square inch gauge and preferably from about 12 to 20 lbs. Such pressures are readily tolerated by operators for reasonable periods. The product is introduced through the hopper 23 and rotary valve 24 to the continuous heater H and it is there rapidly heated with agitation to what will be termed the maximum temperature of from 260 to 310° F., and preferably from 280 to 300° F. in a time interval of from 10 to 180 seconds and preferably from 10 to 90 seconds. The steam in the jacket 26 of the heater H produces this heating and it may be supplemented by supplying live steam directly to the product in the heater cylinder 25. The pressure within the heater H will be the vapor pressure of the product liquid at the highest temperature to which it is heated. For maximum temperatures in the preferred range of from 280 to 300° F., these pressures will be of the order of 35 to 53 lbs. per square inch gauge; that is, the heater pressure will be not only above the atmospheric boiling point but also above the processing room pressure. A gauge 104 connected to the interior of the batch heater H is provided to indicate this pressure.

After heating to the maximum temperature in the time interval indicated, the product may in some cases be held for an interval at this temperature. As explained above, this holding, when required, is accomplished by building up a column of the product in the outlet chamber 32 of the heater H, and this by temporarily retarding the rate of operation of the rotary valve 33. The holding time at maximum temperature may be from 0 to 3 minutes, and is preferably from 0 to 30 seconds. If no holding time at maximum temperature is required, the valve 33 operates at a rate such that none of the product accumulates in the outlet chamber 32.

If the product is of a nature such as to withstand an abrupt reduction in pressure to a point below the boiling point of the product liquid at the prevailing temperature, the cooler C is operated at a substantially lower pressure than the heater H. Foods of a homogeneous nature such as liquids, purees, and the like, can be so treated without injury. With such a product under treatment, the valve 33 is employed to pass the product to the cooler C, the gate valve 34 being closed.

The pressure in the cooler C will be maintained by the steam released from the product, and this pressure, which will be in the range of approximately twelve to thirty lbs. per square inch gauge, may be maintained by venting the cooler through a valved pipe 105. The cooler pressure is indicated by the gauge 106. The cooling time from maximum temperature to the filling temperature attained at the outlet of the cooler is from 5 to 60 seconds, and preferably in the range of from 5 to 30 seconds, and the temperature to which the product is here cooled, and which is herein termed the filling temperature, is from 230 to 270° F. and preferably from 245 to 260° F. The product leaves the cooler C through the rotary valve 37 and flows into the filling hopper 39. This hopper is preferably closed by a cover 110 as indicated to prevent the entrance of stray bacteria or spores that may be present in the air of the processing room. The cover 110 need not be pressure-tight, since the filling temperature at which the food enters the hopper 39 is below the boiling point of the product liquid at the pressure maintained in the processing room.

If the product is such as to be physically impaired by an abrupt drop in pressure, the cooler C may be maintained at the same pressure as the heater H. This is usually accomplished by introducing a sterile non-condensable gas, such as air or preferably nitrogen, into the cooler C through the pipe 105. Nitrogen or some other inert gas is preferred to air, because its use avoids oxidation of the product. Where a partial pressure of non-condensable gas is maintained in the cooler C, the rotary valve 33 may be stopped, and the gate valve 34 opened and employed to control the flow of the product from the chamber 32 and the holding of product therein, if such holding is employed. Some steam enters the cooler C with the product and is quickly condensed. Added steam may be used to maintain the desired pressure in the cooler C in cases where the resultant dilution of the product by steam condensate is permissible, and where the cooling of the product is not too greatly retarded by the steam. In some cases, steam mixed with a non-condensable gas, such as air or nitrogen, may be used to maintain the pressure in the cooler C.

If because of the nature of the product or for other reasons, it is desirable to avoid continuous treatment, batch operation is used for the bulk heating and cooling steps of the process. In this case, a quantity of the product is brought into the processing room in the large kettle 21. The heat exchangers E₁, E₂ and E₄ are filled from the kettle 21 in rotation. When each heat exchanger is filled, the food therein is heated to the maximum temperature by introducing steam to the jacket 50 from the pipe 51, the agitator 48' being operated to increase the rate of heat transferred to the product. At the end of the heating period, the supply of steam is cut off by closing the valve 52, and if a holding period is required, a time interval is permitted to elapse before cooling is commenced. Cooling of the product to filling temperature is accomplished by introducing a cooling fluid to the jacket 50 from the pipe 53 while continuing agitation of the product. The heating time and maximum temperature, the holding time at maximum temperature, and the cooling time and filling temperature produced in the batch operation are within the same ranges as are set forth above in connection with the continuous operation.

The heat exchangers E₁, E₂, etc., are emptied in rotation into the collecting hopper 49 and the product then flows into the jacketed hopper 39. The hopper 49 may be provided with a cover 111 as indicated to prevent the entrance of stray spoilage organisms, but the hopper 49 is maintained at the pressure of the processing room. The product is maintained at the filling temperature in the hopper 39 by steam supplied to the jacket 43 through the valved pipe 108, and condensate is drained from the jacket through the valved pipe 109.

The product at filling temperature is filled into the partially presterilized cans 60 and these cans are closed by the partially presterilized lids 57 in the closing machine. The product at the time of filling is sterilized to the extent of from about 50 to 97% and preferably from about 70 to 95%. This means that the heat treatment to which the product has been subjected at the time of filling is from 50 to 97% or preferably from 70 to 95% of that required for complete sterilization. The cans 60 and the lids 57 are preferably similarly partially sterilized at the time of filling and closing, although they may be completely sterilized at this time if desired. The can and lid sterilization is preferably accomplished by supplying steam to the tunnels 77 and 88 under a pressure somewhat above that prevailing in the processing room and such as to produce a temperature above 260° F., and preferably in the range from about 275 to 310° F. Steam from the can and lid sterilizing tunnels 77 and 88 passes through the rotary feeders 62 and 70 into the interior of the housing 72 that encloses the can filling and closing mechanism. This steam from the housing 72 passes into the processing chamber through the can outlet in the rotary table 67. The steam so introduced within the housing 72 mingles with air therein, and the proportion of steam and air is indicated by the temperature responsive element 75. The temperature within this housing is maintained at a value preferably within the range of about 160 to 260° F., by supplemental steam introduced through the pipe 73 under control of the valve 74 operated by the control mechanism R₄. The flow of steam into the housing 72 and therethrough in the direction of movement of the cans prevents the entrance of stray bacteria into the food during the filling and sealing operations. The possibility of stray bacteria being present in the processing room atmosphere is minimized by sterilizing the air pumped into the room by the blower 9 by means of suitable known apparatus which may be incorporated in the air-conditioning unit 10.

The filled and closed cans 60 are turned to horizontal positions in the can turning chute 93. This brings the product into contact with the inside of the can lids, and since the cans rotate as they descend through the chute 93, the product is brought in contact with the entire interior surface of the closed cans.

The canned product at substantially the filling temperature is held for a time interval of from 10 seconds to 5 minutes and preferably from 10 seconds to 2 minutes in order to complete the sterilization of the product and the containers in which it is enclosed. As has been explained, this completion of the sterilization operation after sealing of the containers has the advantage of destroying any stray spoilage organisms that may have accidentally entered the product or the cans after the initial heat treatment and prior to closing of the cans. This holding at filling temperature is carried out by conveying the cans through the conveyor S, the speed of which can be adjusted to produce the desired holding interval. The insulation of the conveyor S from the atmosphere of the processing chamber by means of the wall 98 prevents both undue heating of the processing room air and any material drop in the temperature of the product during the holding interval.

Immediately after the end of the holding period, the canned product may be cooled in the cooler L. This cooling preferably carries the product temperature down to a value close to but still somewhat above the boiling point of the product at atmospheric pressure. The cooler L operates at the pressure of the processing room, so that there is no danger of buckling of the can ends due to internal pressure produced by a mixture of air and water vapor from the product liquid within the can at approximately the filling temperature of the product. The product may be cooled to within about 15° F. of the boiling point of the product liquid at atmospheric pressure in passage through the cooler L, and at this temperature it is safe to remove the cans from the processing room without buckling. This cooling of the canned product is carried out in a time interval of from about 10 seconds to 5 minutes and preferably from about 10 seconds to 2 minutes. When the product is put up in small cans and is filled at temperatures not above about 250° F., the cooling of the closed cans inside the processing chamber may be omitted. The cans of the product are passed out of the room through the rotary valve 102, and may be thereafter further cooled by any suitable known apparatus to a temperature at which heat deterioration of the product does not take place under the conditions of storage or shipment to which the cans are to be subjected.

Several specific examples of the application of our process to the sterilization and canning of certain foods will now be given.

Example I

For vegetable food products, including strained spinach, carrots and beets, which have a pH in the range of 5.0 to 5.5, the product is first heated to a maximum temperature of from 270° to 300° F. in a time interval of from 90 to 50 seconds, the longer time being employed with the lower temperature. Specifically, the relation of the maximum temperatures to the time intervals in which they are attained is approximately as follows:

| Maximum Temperature, Degrees F. | Time, Seconds |
|---|---|
| 300 | 50 |
| 290 | 60 |
| 280 | 75 |
| 270 | 90 |

No holding period at maximum temperature is employed with these products. The product is cooled to the filling temperature in about 60 seconds, and the heating to maximum temperature and cooling therefrom to filling temperature may be carried out in either the continuous or the batch apparatus. The filling temperature may be about 255° F., or lower temperatures down to about 240° F. may be employed with the changes indicated below. The cans and covers may be partially presterilized at about 260° F. for about 160 seconds, or at higher temperatures for shorter time intervals. Filling and closing is accomplished in about ten seconds. The filled and closed cans are then held at or substantially at the filling temperature for about 60 seconds. They are then cooled in the cooler L in a time interval of about 10 seconds to a temperature of about 15° F. above the boiling point of the product liquid at atmospheric pressure, that is, to about 227° F. The foregoing example contemplates the use of No. 2 size cans. When No. 10 size cans are used, the time interval for cooling the canned product in the cooler L after holding is increased to about 25 seconds. Lower filling temperatures may be used by increasing the time of heating to maximum temperature. Thus, with a filling temperature of about 247° F., the time intervals for heating to the maximum temperatures are increased by about 5 seconds from the values given in the above table and with a filling temperature of about 240° F., these time intervals are increased about 10 seconds from those values. The time for partial presterilization of the cans and covers at the lower filling temperatures is preferably increased over that given above by about 10 seconds for a filling temperature of 270° F. and by about 15 seconds for a filling temperature of 240° F.

*Example II*

Evaporated milk, having a pH of about 6.1, is treated by the continuous equipment and is heated to a maximum temperature in the range indicated in Example I in time intervals of from 120 to 95 seconds according to the following table:

| Maximum Temperature, Degrees F. | Time, Seconds |
|---|---|
| 300 | 95 |
| 290 | 120 |
| 280 | 120 |
| 270 | 120 |

With maximum temperatures of 290 to 300° F., no holding period at this temperature is employed. With a maximum temperature of 280° F., a 3-second holding period is used, and with a maximum temperature of 270° F., a holding period of 13 seconds is used. The milk is cooled to a filling temperature of about 255° F. in about 60 seconds. The cans and covers are partially pre-sterilized as in Example I and the cans are filled and closed in about 10 seconds. The filled and closed cans are held at about filling temperature for approximately 60 seconds and are then cooled to the exit temperature given in Example I in about 10 seconds if No. 2 cans are used and in about 20 seconds if No. 10 cans are used. Lower filling temperatures require somewhat longer time intervals of heating to the highest maximum temperatures and longer holding at the lower maximum temperatures, as indicated by the following table:

| Filling Temp., Degrees F. | Maximum Temp., Degrees F. | Time to Max. Temp., Seconds | Holding Time, Seconds |
|---|---|---|---|
| 247 | 300 | 100 | 0 |
| 247 | 290 | 120 | 0 |
| 247 | 280 | 120 | 4 |
| 247 | 270 | 120 | 17 |
| 240 | 300 | 115 | 0 |
| 240 | 290 | 120 | 0 |
| 240 | 280 | 120 | 4 |
| 240 | 270 | 120 | 20 |

*Example III*

Thin soups and peas, having a pH of about 5.0 to 6.0, are treated by either the batch or the continuous equipment and heated to a maximum temperature in the range indicated in Example I in time intervals of 110 to 120 seconds, according to the following table:

| Maximum Temperature, Degrees F. | Time, Seconds |
|---|---|
| 300 | 110 |
| 290 | 120 |
| 280 | 120 |
| 270 | 120 |

With maximum temperatures of 290 to 300° F., no holding period at maximum temperature is employed. With a maximum temperature of 280° F., a 4-second holding period is used. With a maximum temperature of 270° F., a 19-second holding period is used. The product is cooled to a filling temperature of about 255° F. in about 60 seconds. The cans and covers are partially pre-sterilized as in Example I and are filled and closed in about 10 seconds. The filled and closed cans are held at about the filling temperature for approximately 60 seconds and are then cooled to the exit temperature given in Example I in about 10 seconds if No. 2 cans are used, and in about 25 seconds if No. 10 cans are used. Lower filling temperatures require somewhat longer holding at the lower maximum temperatures as indicated by the following table:

| Filling Temp., Degrees F. | Maximum Temp., Degrees F. | Time to Max. Temp., Seconds | Holding Time, Seconds |
|---|---|---|---|
| 247 | 300 | 120 | 0 |
| 247 | 290 | 120 | 1 |
| 247 | 280 | 120 | 5 |
| 247 | 270 | 120 | 21 |
| 240 | 300 | 120 | 0 |
| 240 | 290 | 120 | 1 |
| 240 | 280 | 120 | 6 |
| 240 | 270 | 120 | 23 |

*Example IV*

Thick soups and corn with pH values in the range 5.5 to 6.3 are treated by either the continuous or the batch equipment and are heated to maximum temperatures of from 270 to 300° F.

in a time interval of about 120 seconds. With a maximum temperature of 300° F., no holding at maximum temperature is employed. The holding times at maximum temperature are as follows for lower maximum temperatures: at 290, 1 second; at 280, 6 seconds; and at 270, 23 seconds. The product is cooled to a filling temperature of about 255° F. in about 60 seconds. The cans and covers are partially pre-sterilized, as indicated in the foregoing examples and are filled and closed in about 10 seconds. The filled and closed cans are held at the filling temperature for about 60 seconds and then cooled to the exit temperature given in Example I in about 15 seconds if No. 2 cans are used and in about 30 seconds if No. 10 cans are used. The temperatures and times given are also applicable to filling temperatures down to about 247° F. At a filling temperature of about 240° F., the holding time at maximum temperature is increased slightly, the suitable holding times at the various maximum temperatures being as follows: for 300° maximum temperature, 1 second; for 290°, 2 seconds; for 280°, 7 seconds; and for 270°, 27 seconds.

*Example V*

Chop suey is treated by the batch procedure. It is heated to a maximum temperature of about 280° in about 2 minutes, and is thereafter held at the maximum temperature for about 6 seconds. It is then cooled from the maximum temperature to a filling temperature of about 247° F. in about 60 seconds. The product at the filling temperature is filled into the partially pre-sterilized cans and they are sealed with the partially pre-sterilized lids, the filling and closing being completed in about 10 seconds. The filled and sealed cans are held for approximately 60 seconds at substantially the filling temperature and are then cooled for about 30 seconds to the exit temperature disclosed above in Example I.

We claim:

1. A process for canning and sterilizing a food product which comprises rapidly heating the entire product in bulk under sufficient superatmospheric pressure to prevent boiling of the liquid content thereof to a maximum temperature above the atmospheric boiling point of the liquid, rapidly cooling the product in bulk from such maximum temperature to a filling temperature above the atmospheric boiling point of the product liquid, such heating and cooling comprising a heat treatment from 50 to 97% as great as that required for complete sterilization of the product, filling and sealing the so treated product while under superatmospheric pressure above the boiling point of the product liquid at the filling temperature in containers sterilized to substantially the same degree as the product filled therein, and holding the filled and sealed containers under such superatmospheric pressure and approximately at such filling temperature for an interval sufficient to complete the sterilization of the product and the containers.

2. A process for canning and sterilizing a food product which comprises rapidly heating the entire product in bulk under sufficient superatmospheric pressure to prevent boiling of the liquid content thereof to a maximum temperature above the atmospheric boiling point of the liquid, holding the product at such maximum temperature for a time interval not exceeding 3 minutes, rapidly cooling the product in bulk from such maximum temperature to a filling temperature above the atmospheric boiling point of the product liquid, such heating and cooling comprising a heat treatment from 70 to 95% as great as that required for complete sterilization of the product, filling and sealing the so treated product while under superatmospheric pressure above the boiling point of the product liquid at the filling temperature in containers sterilized to substantially the same degree as the product filled therein, holding the filled and sealed containers under such superatmospheric pressure and approximately at such filling temperature for an interval sufficient to complete the sterilization of the product and the containers, and then cooling the product while under such superatmospheric pressure to a temperature within approximately 15° F. of the boiling point of the liquid at atmospheric temperature in a time interval of from 10 seconds to 5 minutes.

3. A process for canning and sterilizing a low acid food product which comprises rapidly heating the product in bulk and with agitation and under superatmospheric pressure high enough to prevent boiling of the product liquid to a maximum temperature of from 260 to 310° F. within a time interval of from 10 to 180 seconds, cooling the product from such maximum temperature to a filling temperature of from 230 to 270° F. and in a time interval of from 5 to 60 seconds, filling and sealing the so treated product while under superatmospheric pressure above the boiling point of the product liquid at such filling temperature into partially sterilized containers, holding the filled and sealed containers under such superatmospheric pressure and substantially at the filling temperature for an interval of from 10 seconds to 5 minutes and then cooling the product while under such superatmospheric temperature to a temperature within approximately 15° F. of the boiling point of the product liquid at atmospheric temperature in a time interval of from 10 seconds to 5 minutes.

4. A process for canning and sterilizing a low acid food product which comprises rapidly heating the product in bulk and with agitation and under superatmospheric pressure high enough to prevent boiling of the product liquid to a maximum temperature of from 280 to 300° F. within a time interval of from 10 to 90 seconds, holding the product at such maximum temperature for a time interval of from 0 to 3 minutes, cooling the product from such maximum temperature to a filling temperature of from 245 to 260° F. and in time interval of from 5 to 30 seconds, filling and sealing the so treated product while under superatmospheric pressure above the boiling point of the product liquid at such filling temperature into partially sterilized containers, holding the filled and sealed containers under such superatmospheric pressure and substantially at the filling temperature for an interval of from 10 seconds to 2 minutes and then cooling the product while under such superatmospheric temperature to a temperature within approximately 15° F. of the boiling point of the product liquid at atmospheric temperature in a time interval of from 10 seconds to 2 minutes.

5. A process for canning and sterilizing a low acid food product which comprises heating the product in bulk under sufficient superatmospheric pressure to prevent boiling of the product liquid to a maximum temperature of at least 280° F., cooling the product in bulk from such maximum temperature to a filling temperature below 260° F. while maintaining the product at a pressure above its boiling point, said heating and cooling steps being completed in a time interval not exceeding 100 seconds, filling and sealing the so treated product in partially sterilized containers while under superatmospheric pressure above the boiling point of the product liquid at the filling temperature, holding the enclosed product under such pressure at substantially said filling temperature for from about 10 seconds to 2 minutes and then cooling the enclosed product from the filling temperature to a temperature not more than about 15 degrees above the atmospheric boiling point of the product liquid in a time interval not exceeding 2 minutes.

6. A process for canning and sterilizing a low acid food product which comprises heating the product in bulk under sufficient superatmospheric pressure to prevent boiling of the product liquid to a maximum temperature of a least 280° F., holding the product at such maximum temperature for an interval not exceeding 30 seconds, cooling the product in bulk from such maximum temperature to a filling temperature below 260° F. while maintaining the product at a pressure above its boiling point, said heating and cooling steps being completed in a time interval not exceeding 100 seconds, filling and sealing the so treated product in partially sterilized containers while under superatmospheric pressure above the boiling point of the product liquid at the filling temperature, holding the enclosed product under such pressure at substantially said filling temperature for from about 10 seconds to 2 minutes and then cooling the enclosed product from the filling temperature to a temperature not more than about 15 degrees above the atmospheric boiling point of the product liquid in a time interval not exceeding 2 minutes.

7. A process for canning and sterilizing a low acid food product which comprises heating the product in bulk under sufficient superatmospheric pressure to prevent boiling of the product liquid to a maximum temperature of at least 280° F. in a time interval of about 2 minutes, cooling the product in bulk from such maximum temperature to a filling temperature of about 247° F. in a time interval of about 60 seconds while maintaining the product at a pressure above its boiling point. filling and sealing the so treated product in partially sterilized containers while under superatmospheric pressure above the boiling point of the product liquid at the filling temperature, holding the enclosed product under such pressure at substantially such filling temperature for about 60 to 70 seconds, and then cooling the enclosed product in about 30 seconds from the filling temperature to a temperature not more than about 15° above the atmospheric boiling point of the product liquid.

8. A process for canning and sterilizing a low acid food product which comprises heat treating the product in bulk by first increasing its temperature to at least 280° F. and then lowering its temperature to from 245° to 260° F. all in a time interval not substantially exceeding 120 seconds, such heat treatment being from 70% to 95% as great as that required for complete sterilization of the product, sealing the so treated product in closed containers partially pre-sterilized to at least the same degree as the product filled therein and holding the filled containers at substantially the filling temperature for a time interval sufficient to complete the sterilization of the product and the containers.

9. A process for canning and sterilizing a low acid food product which comprises heating the product at temperatures reaching a maximum value that exceeds the atmospheric boiling point of the product liquid by at least about 70° F. in a time interval not exceeding about 90 seconds, then cooling the product to a filling temperature of from 245° to 260° F. in not more than about 30 seconds, sealing the so treated product in at least partially pre-sterilized cans while at such filling temperature, holding the product in such cans substantially at such filling temperature for a time interval not substantially exceeding 2 minutes, and maintaining the product and the filled cans under superatmospheric pressures sufficient to prevent boiling of the liquid content of the product throughout such steps.

10. A process for canning and sterilizing a low acid food product which comprises heating the product at temperatures reaching a maximum value that exceeds the atmospheric boiling point of the product liquid by at least about 70° F. in a time interval not exceeding about 90 seconds, holding the product at such maximum temperature for an interval not exceeding about 30 seconds, then cooling the product to a filling temperature of from 245 to 260° F. in not more than 30 seconds, sealing the product in at least partially pre-sterilized cans while at such filling temperature, holding the product in such cans substantially at such filling temperature for a time interval of from 10 seconds to about 2 minutes, rapidly cooling the product in the cans to a temperature within approximately 15° of the atmospheric boiling point of the product liquid, and maintaining the product and the cans under superatmospheric pressures sufficient to prevent boiling of the liquid content of the product throughout such steps.

11. A process for canning and sterilizing a food product which comprises subjecting the product in bulk to a heat treatment in which it reaches temperatures of at least 280° F. and receives sufficient heat to constitute from 70 to 95% of the heat required for complete sterilization thereof, filling and sealing the so treated product in containers pre-sterilized to at least the same degree as the product, holding the filled and sealed product in the containers at a temperature of at least 245° F. for an interval of at least 10 seconds and sufficient to complete the sterilization of the product and the containers, cooling the product in the containers to a temperature within about 15° of the atmospheric boiling point of the liquid content of the product, and maintaining the product and the filled containers under superatmospheric pressures sufficient to prevent boiling of the liquid content of the product throughout such steps.

12. A process for canning and sterilizing evaporated milk, which comprises heating the milk in bulk under superatmospheric pressure sufficient to prevent boiling thereof to a maximum temperature of from 270 to 300° F. in a time interval of from about 120 to 95 seconds, holding the milk at such maximum temperature and under such pressure for a time interval not exceeding about 20 seconds, cooling the milk to a filling temperature of from 240 to 255° F. in an interval of about 60 seconds, filling and sealing the milk in at least partially pre-sterilized cans at such filling temperature in a time interval of about 10 seconds, holding the canned milk at substantially the filling temperature for an interval of about 50 seconds, cooling the canned milk to a temperature within about 15° F. of the boiling point of the milk under atmospheric pressure in about 10 to 20 seconds, and maintaining the milk and the cans under superatmospheric pressure sufficient to prevent boiling of the milk throughout such filling, sealing, holding and cooling steps.

13. A process for canning and sterilizing vegetables which comprises heating the product in bulk and under superatmospheric pressure sufficient to prevent boiling of the liquid content of the product to a maximum temperature of from 270 to 300° F. in a time interval of from 50 to 105 seconds, cooling the product under pressure sufficient to prevent boiling of its liquid content to a filling temperature of from 240 to 255° F. in an interval of about 60 seconds, filling and sealing the product in at least partially pre-sterilized cans at such filling temperature, holding the canned product at substantially the filling temperature for an interval of about 50 seconds, cooling the canned product to a temperature within about 15° F. of the boiling point of the product under atmospheric pressure in about 10 to 25 seconds, and maintaining the product and the cans under superatmospheric pressure sufficient to prevent boiling of the liquid content of the product throughout such filling, sealing, holding and cooling steps.

14. A process for canning and sterilizing a food product which comprises subjecting the product in bulk to a heat treatment in which it reaches a temperature of at least 280° F. and receives sufficient heat to constitute from 70 to 95% of the heat required for complete sterilization thereof, filling and sealing the so treated product in containers pre-sterilized to at least the same degree as the product, holding the filled and sealed product in the containers at a temperature of at least 245° F. for an interval of at least 10 seconds and sufficient to complete the sterilization of the product and the containers, and maintaining the product and the filled containers under superatmospheric pressure sufficient to prevent boiling of the liquid content of the product throughout such steps.

15. A process for canning and sterilizing a food product which comprises rapidly heating the product in bulk and with agitation under superatmospheric pressure high enough to prevent boiling of the product liquid to a maximum temperature of from 280 to 300° F. within a time interval of from 10 to 90 seconds, holding the product at such maximum temperature for a time interval of from 0 to 3 minutes, cooling the product from such maximum temperature to a filling temperature of from 245 to 260° F. and in a time interval of from 5 to 30 seconds, filling and sealing the so treated product while under superatmospheric pressure above the boiling point of the product liquid at such filling temperature into partially sterilized containers, and holding the filled and sealed containers under such superatmospheric pressure and substantially at the filling temperature for an interval of from 10 seconds to 2 minutes.

16. A process for canning and sterilizing a food product which comprises heating the product at temperatures reaching a maximum value that exceeds the atmospheric boiling point of the product liquid by at least about 70° F. in a time interval not exceeding about 90 seconds, then cooling the product to a filling temperature of from 245 to 260° F. in not more than about 30 seconds, sealing the so treated product in at least partially pre-sterilized cans while at such filling temperature, holding the product in such cans substantially at such filling temperature for a time interval not substantially exceeding 2 minutes and conducting all of such steps within a closed chamber capable of holding a superatmospheric pressure sufficient to prevent boiling of the liquid content of the product.

17. A process for canning and sterilizing a food product which comprises rapidly heating the product in bulk and with agitation to a maximum temperature of from 280 to 300° F. within a time interval of from 10 to 90 seconds, holding the product at such maximum temperature for a time interval of from 0 to 3 minutes, cooling the product from such maximum temperature to a filling temperature of from 245 to 260° F. and in a time interval of from 5 to 30 seconds, filling and sealing the so treated product at such filling temperature into partially sterilized containers, holding the filled and sealed containers substantially at the filling temperature for an interval of from 10 seconds to 2 minutes, and conducting all of such steps within a closed chamber capable of holding superatmospheric pressures sufficient to prevent boiling of the liquid content of the product at the temperatures to which it is subjected.

18. A process of canning and sterilizing a food product which comprises subjecting the product in bulk to a heat treatment in which it reaches a temperature of from 260° to 310° F. and receives sufficient heat to constitute at least 50 percent of the heat required for complete sterilization thereof, filling and sealing the so treated product in containers presterilized to at least the same degree as the product, holding the filled and sealed product in the containers at a temperature of at least 245° F. for an interval of at least 10 seconds and sufficient to complete the sterilization of the product and the containers, and maintaining the product and the filled containers under superatmospheric pressure sufficient to prevent boiling of the liquid content of the product throughout such steps.

19. A process for canning and sterilizing a food product which comprises subjecting the product in bulk to a heat treatment in which it reaches a temperature of from 260° to 310° F. and receives sufficient heat to constitute at least 50 percent of the heat required for complete sterilization thereof, filling and sealing the so treated product in containers presterilized to at least the same degree as the product, holding the filled and sealed product in the containers at a temperature of at least 245° F. for an interval of at least 10 seconds and sufficient to complete the sterilization of the product and the containers, cooling the product in the containers to a temperature within about 15° of the atmospheric boiling point of the liquid content of the product, and maintaining the product and the filled containers under superatmospheric pressure sufficient to prevent boiling of the liquid content of the product throughout such steps.

HORACE L. SMITH, Jr.
CHARLES O. BALL.

REFERENCES CITED

The following references are of record in the file of this patent:

UNITED STATES PATENTS

| Number | Name | Date |
| --- | --- | --- |
| 1,857,450 | Hansen | May 10, 1932 |
| 1,863,447 | Kronquest | June 14, 1932 |
| 2,011,631 | Hansen | Aug. 20, 1935 |
| 2,239,008 | Loetscher | Apr. 22, 1941 |
| 2,338,003 | Mills et al. | Dec. 28, 1943 |